US006402372B1

United States Patent
Saunders

(10) Patent No.: US 6,402,372 B1
(45) Date of Patent: Jun. 11, 2002

(54) PROCESS TEMPERATURE MONITOR, AND METHOD FOR MONITORING PROCESS TEMPERATURES

(75) Inventor: Roger I. Saunders, Hollis, NH (US)

(73) Assignee: Electronic Controls Design, Inc., Milwaukee, OR (US)

( * ) Notice: Subject to any disclaimer, the term of this patent is extended or adjusted under 35 U.S.C. 154(b) by 0 days.

(21) Appl. No.: 09/385,554

(22) Filed: Aug. 30, 1999

(51) Int. Cl.⁷ .................................................. G01K 1/14
(52) U.S. Cl. .................... 374/179; 374/137; 374/166; 219/388; 136/230
(58) Field of Search .................. 374/179, 137, 374/166, 208, 141, 142, 149; 219/388; 702/130, 136, FOR 142; 99/DIG. 10, 324; 136/230

(56) References Cited

U.S. PATENT DOCUMENTS

| 3,088,072 | A | * | 4/1963 | Clifford et al. ............... 374/32 |
| 4,180,199 | A | * | 12/1979 | O'Rourke et al. ..... 340/870.11 |
| 4,607,961 | A | * | 8/1986 | Wynnyckyj et al. ........ 374/179 |
| 4,906,105 | A | * | 3/1990 | Geake ........................ 374/30 |
| 5,003,160 | A | * | 3/1991 | Matsuo et al. ............... 219/388 |
| 5,161,889 | A | * | 11/1992 | Smith et al. ................... 374/29 |
| 5,739,443 | A | | 4/1998 | Saunders .................... 73/866.5 |
| 5,820,266 | A | | 10/1998 | Fedak ......................... 374/179 |
| 5,971,249 | A | * | 10/1999 | Berkin ....................... 228/102 |
| 6,062,728 | A | * | 5/2000 | Breunsbach et al. ........ 374/137 |
| 6,168,064 | B1 | * | 1/2001 | Berkin ........................ 219/388 |

OTHER PUBLICATIONS

Advertising Leafle "OvenRIDERTM" distributed 1999 by ECD, (prior to Aug. 30, 1999 p. 1.

* cited by examiner

Primary Examiner—Diego Gutierrez
Assistant Examiner—Stanley J. Pruchnic, Jr.
(74) Attorney, Agent, or Firm—Klarquist Sparkman, LLP

(57) ABSTRACT

A monitor, and method, for monitoring temperatures at various specific times and locations in a test or manufacturing process, and for comparing those temperatures with reference profiles of optimum temperatures. Both the monitor and the method are especially well suited for checking the temperatures of various zones of reflow ovens used in mass soldering the connections of electronic components on circuit boards. The monitor is designed to distinguish clearly among respective temperatures at several points on tops and bottoms of circuit boards.

29 Claims, 13 Drawing Sheets

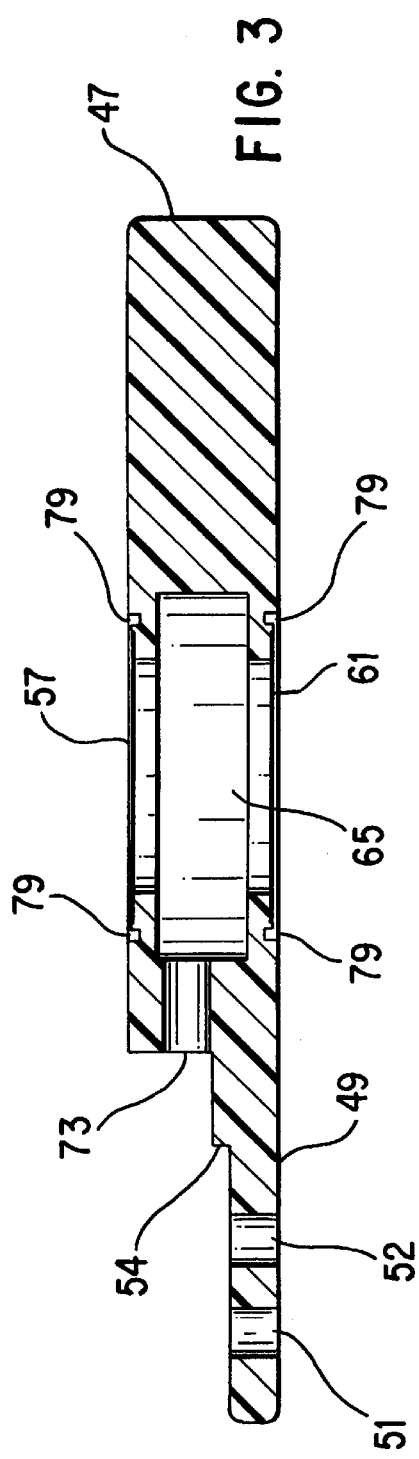
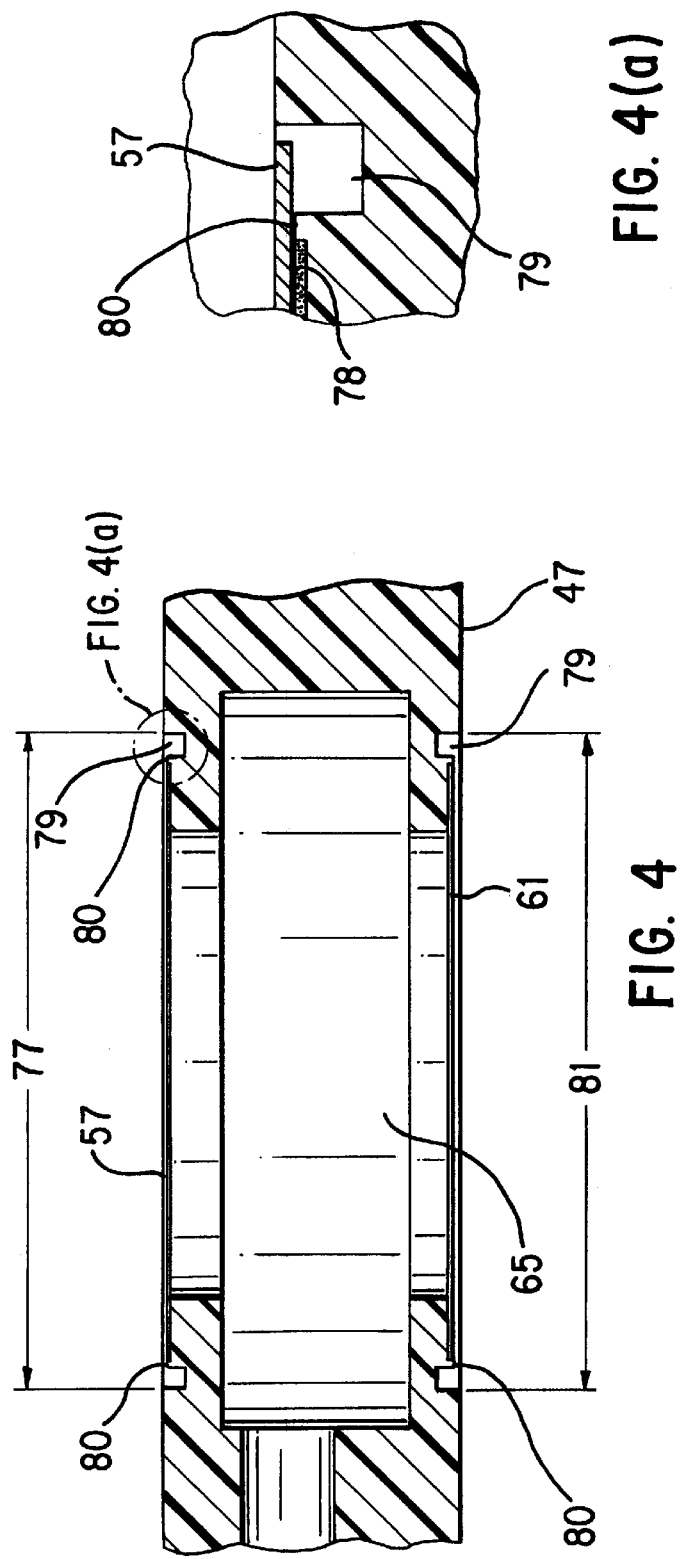

PROCESS TEMPERATURE MONITOR, AND METHOD FOR MONITORING PROCESS TEMPERATURES

BACKGROUND OF THE INVENTION

1. Field of the Invention

This invention relates to a monitor, and method, for monitoring temperatures at various specific times and locations in a test or manufacturing process, and for comparing those temperatures with respective standards or norms for those times and locations. It is especially well suited for monitoring pertinent temperatures of critical zones of reflow ovens used in the mass soldering of the connections of electronic circuit boards and their components, or in similar processes. Although especially well suited for use in the manufacture of electronic circuit boards (hereinafter called "circuit boards"), the invention is also useful in a number of process industries, some of which are not related to electronics.

The subject matter of this invention has been recorded with the U.S. Patent and Trademark Office under the Document Disclosure Program. The following Document Disclosure Numbers have been accorded to those records:

No. 426554 on Oct. 14, 1997;
No. 427127 on Oct. 31, 1997; and
No. 431579 on Feb. 9, 1998.

Separate letters are being submitted in this application, requesting that those Disclosure Documents be permanently maintained by the Patent and Trademark Office.

2. Description of the Prior Art

A closely-related, informative item of technical literature is U.S. Pat. No. 5,739,443, entitled "Carrier for a Monitoring Device" and issued on Apr. 14, 1998 to the present applicant. In order to conserve space, the entire "Description of the Prior Art" set forth in columns 1, 2 and 3 of that patent is incorporated herein by reference. Columns 1 and 2 include a comprehensive introduction of the topic of "thermal profiling" in reflow ovens and wave soldering machines. However, it will be desirable to present more details in the paragraphs which follow, before moving on to the novel features of this invention. Temperatures, at certain times and locations in a reflow oven, are of critical importance in the mass soldering of circuit boards. On the other hand, there may be other process industries in which temperatures have comparable importance. They should not be overlooked in a study of the background of this invention.

U.S. Pat. No. 5,820,266—Fedak discloses a "Traveling Thermocouple Method & Apparatus," which is directed to the processing of components, such as microprocessor chips, supported on a tray or plate on a driven conveyor. The disclosure relates to ways of measuring the temperature of the product during its passage through a vertical oven, having corners, without entangling the leads of the thermocouples as they are pulled through the oven. The Fedak patent does not disclose, or imply, anything like the monitor and method of the present invention.

OBJECT OF THE INVENTION

It is an object of the invention to provide a monitor and method for economically and repeatably obtaining thermal-profile data from a process oven, whereby to detect changes in thermal process parameters, typically in the mass soldering of circuit-board assemblies.

SUMMARY OF THE INVENTION

Briefly, the monitor in accordance with this invention comprises a structural assembly of temperature-resistant materials, instrumented with thermocouples, preferably near both the top and the bottom of the assembly, and adapted for passage through a multi-zone oven, or other heat-processing enclosure, of arbitrary width, length and conveyor speed. The thermocouples of the assembly are to be connected to input terminals of a "thermal profiler" or other data logger which records the output voltages of the respective thermocouples at various specific times and locations in the oven. The monitor simulates, but with greater sensitivity and repeatability, the thermal response of thermocouples mounted on the top and bottom of a typical circuit board which is to be replicated in quantity. The monitor is constructed to minimize deterioration of its components and change of its response with use and the passage of time.

The method in accordance with this invention comprises the following steps:

1. Establish the proper thermal profile for a circuit board to be processed in the oven by:
   (a) attaching thermocouples at critical locations on a typical assembled circuit board and connecting them to respective input terminals of a thermal profiler which is to accompany the circuit board through the oven;
   (b) repeatedly passing the typical circuit board and thermal profiler through the soldering process by means of the conveyor running through the oven; and
   (c) adjusting the conveyor speed and the set temperatures for respective zones of the oven until the optimum thermal profile is established for that typical circuit board; and then
2. Record a reference thermal profile by:
   (d) disconnecting the thermocouples from the thermal profiler and connecting the monitor to the thermal profiler;
   (e) passing the monitor and thermal profiler through the oven on the conveyor without changing the speed or set temperatures; and
   (f) establishing in permanent memory the reference profile derived from each of the thermocouples of the monitor as a function of time and/or location (zone) in the oven; and later
3. When it becomes necessary or desirable to verify or reset any or all of the zone temperatures of the oven, do so by:
   (g) passing the monitor and thermal profiler through the oven on the conveyor;
   (h) recording and plotting the current thermal profile of the oven as a function of time and/or location (zone) in the oven;
   (i) comparing the current thermal profile with the reference profile; and
   (j) adjusting the set temperatures of the respective zones of the oven and repeating steps (g), (h) and (i) until the current profile substantially matches the reference profile.

BRIEF DESCRIPTION OF THE DRAWINGS

The invention summarized above will be described in detail in the following specification. The specification will be best understood if it is read while referring to the accompanying drawings, in which:

FIG. 3 is an enlarged elevation view, in section, of a portion of the sensor assembly of FIG. 2;

FIGS. 4 and 4(a) are still-more-enlarged elevational views, in section, of a detail of the portion of the sensor assembly of FIG. 3;

In FIG. 13, the second configuration of temperature monitor is illustrated in a typical, somewhat expanded mode so as to display clearly the baffles which are characteristic of the second configuration. In FIG. 14, by contrast, the temperature monitor is shown in its "compact" mode, with baffles interleaved, to permit passage of the temperature monitor through an oven having a narrow passageway.

DETAILED DESCRIPTION OF THE PREFERRED MODE OF CARRYING OUT THIS INVENTION

Figure 1:
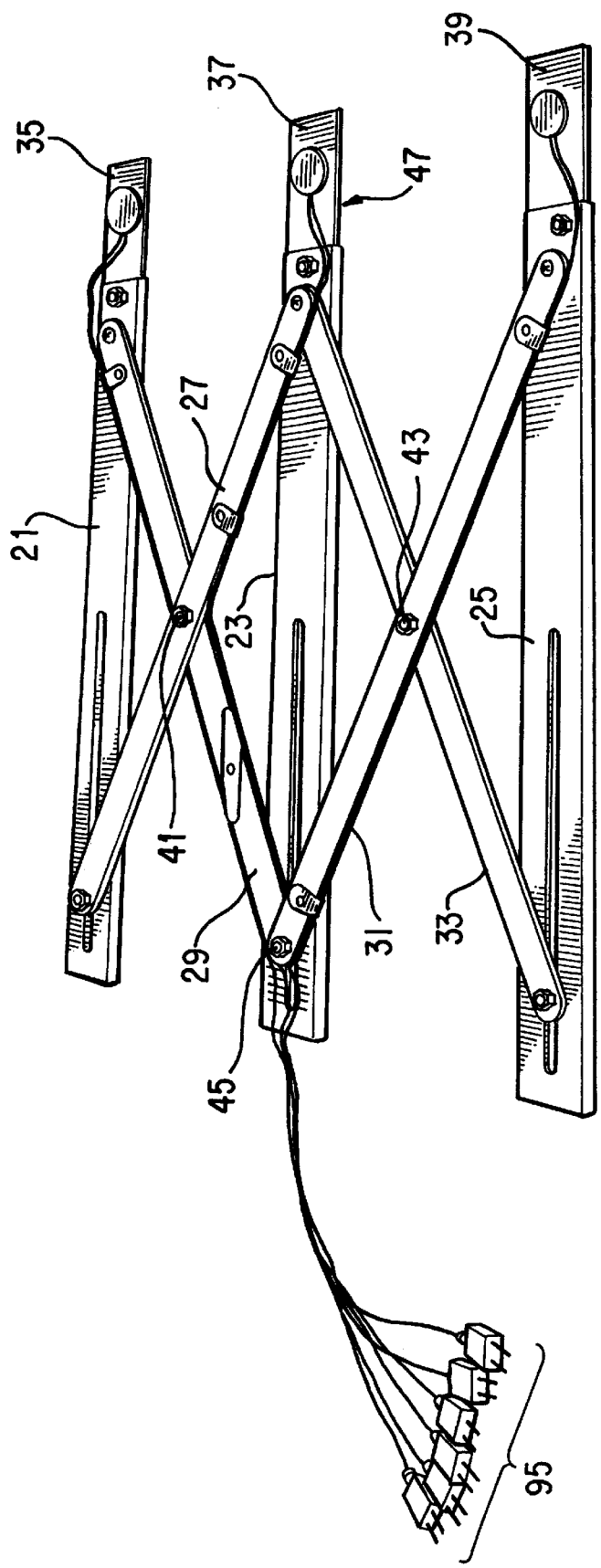
FIG. 1 is a perspective view of a first configuration of temperature monitor in accordance with this invention in a typical, somewhat expanded mode.

In order to assure repeatable quality in the reflow process of mass soldering electronic components to circuit boards, it is essential to establish and maintain the proper thermal profile within and throughout the reflow oven. The term "thermal profile" means a plot of temperature as a function of time (or possibly position) as the circuit board and its electronic components are conveyed through the oven for execution of the mass soldering. In this process, "surface-mount technology" is commonly used. However, the utility of the invention is not limited to that or any other mounting technology. Nor is the usefulness of the invention limited to reflow ovens or, in fact, to the processing of circuit boards.

Customarily, in preparing for a production run of circuit-board assemblies, one particular typical circuit board is instrumented with thermocouples attached to critical components on the board, and the electrical leads of the thermocouples are connected to respective input terminals of a data logger known as a "thermal profiler." The board and the profiler are then repeatedly conveyed through the oven while its operating parameters are adjusted. The adjustments may include conveyor speed as well as set temperatures in each of the "zones" of the oven. A typical oven may comprise about ten zones, each having an independent set temperature.

The adjustments may be influenced, or even governed, by several conditions, or "ground rules," among which are the following:

1. In order to avoid inducing thermal stress in certain types of components, the time rate of change during the "ramp-up" of temperature in the first few zones of the oven may not exceed a certain maximum value.
2. The dwell time during the "temperature-soak" phase of the process in the mid-zones of the oven must be sufficient to bring the temperatures of the larger components up to a desired level which is safely below their respective temperature limits.
3. The "peak" temperatures in a later zone wherein the solder melts and must penetrate all interstices must be high enough to ensure fluidity of the solder but not sufficiently high to damage the components. And the peaks must have a very short duration in time so as not to damage the smaller components, typically semiconductors.
4. There must be a near-uniformity among temperatures at various positions on each circuit board at any given time. If components are present on both the top and the bottom of the board, they must usually be subjected to nearly equal temperatures. However, under some circumstances it is desirable to avoid melting the solder on one side of the circuit board. Under those particular circumstances, a certain temperature differential must be maintained between the top and bottom sides of the board.
5. While satisfying the above-mentioned criteria, the conveyor speed must be set at a level sufficient to ensure a high rate of production of completed circuit-board assemblies.

Clearly, more than one passage of the instrumented "typical" circuit board through the oven will be necessary in order to optimize the variables mentioned in the foregoing paragraphs. But, with skill and patience, an "optimum thermal profile" is achieved, and the various settings of the oven are "fixed", at least for the first portion of the production run. When the initial optimization is complete, it has been customary to retain the instrumented "typical" circuit board, often referred to as a "golden board". The final run of this "golden board" through the oven, coupled to a thermal profiler, would be recorded as the initial "optimum thermal profile."

As time passes, with the circuit boards in production, it becomes necessary, or at least desirable, to recheck the settings of the various parameters of the oven, either to prevent the quality of the circuit-board product from deteriorating or to determine whether "preventive maintenance"

is required. After all, it is best not to wait until those expensive circuit boards are rejected or, still worse, must be recalled and replaced along with payment of damages.

The prior-art "golden board" had several defects in addition to the expense of dedicating a "production board" as a "standard":

1. It wasn't a very good standard because its thermal characteristics changed with time and repeated exposure to oven temperatures.
2. Each time thermocouples were attached to components on the golden board, the characteristics of those components could change.
3. The golden board usually did not distinguish between temperature levels on top of the board and temperature levels on its bottomside. Even in ovens of the forced-convection, or infrared type, topside temperatures could change relative to bottomside temperatures, and not be detected.
4. There was no means for enhancing the reaction rate of the components on the golden board to small-but-significant changes in oven temperature at particular zones or times. And different components on the golden board had different reaction rates, or thermal "time constants," depending upon their physical and thermal mass. In general, large components had longer thermal time constants than small components.

In order to enhance the quality of their product, certain high-volume producers of circuit boards are now using "Statistical Process Control" on their reflow production lines. This methodology entails the frequent acquisition of thermal-profile data and the analysis of the data to determine trends in the thermal process. On the other hand, even low-volume producers of boards must also monitor the thermal process to assure compliance with the standards imposed by their customers. Again, staying within contractual limits requires frequent, economical, reliable acquisition of thermal-profile data and its accurate comparison with a pre-established "reference profile." That is a purpose of this invention.

Before describing all the details of the invention, it will be useful to define three terms so that the following description may be clearly understood:

1. The "optimum thermal profile" is a plot of temperature as a function of time during passage of the "typical circuit board" through the oven and as measured by each of the thermocouples on the "typical circuit board," immediately after the operating parameters of the oven have been optimized and "set." The data for the optimum thermal profile are accumulated by the thermal profiler which accompanies the circuit board through the oven.
2. The "reference thermal profile" is a plot of temperature as a function of time as recorded in the thermal profiler accompanying a monitor in accordance with this invention as they both are conveyed through the oven immediately after the operating parameters of the oven have been set.
3. The "current thermal profile" is a plot of temperature as a function of time as recorded in the thermal profiler accompanying a monitor in accordance with this invention as they both are conveyed through the oven at some later time after the operating parameters of the oven have been set. In some cases, the thermal profiler, rather than accompanying the circuit boards through the oven, is built into the oven structure. In that event, thermocouple connectors must be provided at the oven entrance, along with cables to trail the circuit boards through the oven. The cables are subsequently disconnected at the oven exit.

The first configuration of the invention, as illustrated in FIG. 1 of the drawings, includes a left rail 21, a center rail 23, and a right rail 25, arranged parallel with one another. The parallelism is maintained by two pairs of scissor arms, comprising first scissor arm 27 and second scissor arm 29 coupled between left rail 21 and center rail 23, and third scissor arm 31 and fourth scissor arm 33 coupled between center rail 23 and right rail 25. The first configuration also includes a left sensor 35 mounted upon the leading end of left rail 21, a center sensor 37 mounted upon the leading end of center rail 23, and a right sensor 39 mounted upon the leading end of right rail 25. It will be understood that the monitor of the invention is designed to move through the oven in the direction to which the sensors point—from left to right in FIG. 1.

Rails 21, 23 and 25 preferably have the cross section of channels, and may be formed of a temperature-resistant metal such as 300-series stainless steel. Each of the rails has a longitudinal slot, which may extend more than half the length of the rail, and which slidably receives a pin or other fastener affixed to an end of one or two of the scissor arms.

Scissor arms 27, 29, 31 and 33 may be formed of a temperature-resistant metal such as aluminum, preferably having a finish which is clear hard-coat anodized. One end of each scissor arm carries a fixed pin, or other fastener, which is adapted to slide in a slot of one of the rails. The other end of each scissor arm is pivotally coupled to another one of the rails.

The reason for the pivotal couplings and for the pins sliding in respective slots is to permit the structural assembly of the monitor to be collapsed, or fully expanded, or set anywhere between those two extremes. Another function of scissor arms 27, 29, and 31 is to provide protective passageways for the respective thermocouple wires from sensors 35, 37, and 39 to a common exit point near the intersection of second scissor arm 29 with third scissor arm 31. In one configuration, grooves may be machined in the respective bottom sides of scissor arms 27, 29, and 31, those grooves having cross sections sufficiently large to receive and accommodate the thermocouple wires. The grooves can then be converted into enclosed passageways by brazing or otherwise bonding a thin cover plate to the bottom of each of the aforementioned scissor arms. Preferably, each cover plate would have essentially the same length and width as the scissor arm to which it is bonded, and may be formed of the same material.

In an alternative configuration, a tube would be attached to each of scissor arms 27, 29, and 31 to accommodate the thermocouple wires. In any event, provision needs to be made for transition of thermocouple wires from first scissor arm 27 to second scissor arm 29 at the point where those scissor arms cross each other, in order to convey the signals from the center sensor to the common exit point. To make this provision, a pair of grooves may be machined, or a pair of tubes may be attached in or to second scissor arm 29 from the crossover point to the common exit point. It will be understood that third scissor arm 31 and fourth scissor arm 33 might be chosen as the pathway for the signals from center sensor 37.

The portals of some ovens, set for the processing of small circuit boards, can receive a monitor only three or four inches wide. On the other hand, the portals of an oven which processes boards as wide as twenty-six inches can easily receive a monitor of that width. In fact, if the oven is a reflow oven having edge-conveyor chains set twenty-six inches apart to accommodate the circuit boards, and if the monitor is to ride through the oven on the articulating pins of the same conveyor chains, the monitor must be twenty-six inches wide. So, the double-scissor configuration of the monitor structure allows the width of the monitor to be set anywhere between some very narrow width, such as three inches, and a broad width, such as twenty-six inches, for ovens processing large circuit boards. Of course, the possible width setting may even exceed twenty-six inches. That is why the slots in the rails of the monitor structure are made so long. On the other hand, even narrower widths can be achieved by utilizing only two rails (instead of three), and by linking them by only one pair of scissor arms.

In addition to the fixed pin on one end of each scissor arm, and the pivotal connection of the other end of each scissor arm to a rail, first scissor arm 27 and second scissor arm 29 are pivotally coupled to each other at their crossover point by a first pivot 41. Similarly, third scissor arm 31 and fourth scissor arm 33 are pivotally coupled to each other at their crossover point by a second pivot 43. All of the aforementioned pivotal and sliding joints may be left loosely secured. But the point where second scissor arm 29 and third scissor arm 31 are pinned by a fastener 45 slidable in the slot of center rail 23 must be firmly securable. Fastener 45 at that point may include a slider riding in the underside channel of center rail 23, together with a locking screw which the operator tightens by a knob or other means to lock the structure of the monitor at a desired width.

Turning now to the sensors mounted on the leading ends of the respective rails, they would, in the usual situation, be identical. Typically, the structure of each sensor is as follows: As shown in the exploded drawing of FIG. 2, each of left sensor 35, center sensor 37, and right sensor 39 is an assembly supported by a housing 47, which may be composed of a high-temperature, insulating, structural material such as "Durostone CAS" fiberglass-reinforced epoxy as marketed by Rockling Machined Plastics. Housing 47 has a mounting tang 49, projecting from one end thereof, for insertion into the end of the channel of left rail 21, center rail 23, or right rail 25, as the case may be. Mounting tang 49 may have at least one mounting hole 51 to receive a screw fastener passing through the channel of the rail near its end.

Housing 47 supports, in its top surface, a top thermocouple sensor 53 and, in its bottom surface, a bottom thermocouple sensor 55. Top thermocouple sensor 53 comprises a top metallic disk 57, or equivalent structure, having a top thermocouple 59 mounted at or near its central point. Bottom thermocouple sensor 55 comprises a bottom metallic disk 61, or equivalent structure, having a bottom thermocouple 63 mounted at or near its central point. Within housing 47 is an internal cavity 65, which may be generally cylindrical in configuration, and which may have a diameter and height determined by considerations which will be explained in the following paragraphs. Each of top thermocouple 59 and bottom thermocouple 63 is mounted on its respective metallic disk on a side facing internal cavity 65 rather than the "environment" of housing 47.

Each of top thermocouple 59 and bottom thermocouple 63 may be formed as follows:

The thermocouple junction in each case is formed by welding together the respective ends of two unlike pieces of thermocouple wire while forming the wires adjacent the junction into a small loop about 0.1 inch in diameter. For this purpose, "No. KK-K-28" stranded thermocouple wire, as supplied by STI, provides good physical strength and flexibility, and is very resistant to fatigue failure. I prefer to use Kapton insulation on the wire, for maximum durability. The junction must be strong, it must have low "thermal mass," and it must not deteriorate with time and temperature.

The welded thermocouple junction may then be silver-soldered at or near the center of top metallic disk 57 or bottom metallic disk 61 as the case may be. For this purpose, a minimal amount of silver solder is used. Such minimal amount of solder should be sufficient to immobilize the thermocouple junction on the metallic disk and protect it from damage. At the same time, the solder provides a good, low-thermal-impedance connection between the thermocouple junction and the metallic disk. Alternatively, the thermocouple junction may be spot welded to the metallic disk.

While the width of housing 47 may be kept to a minimum in order to facilitate the collapsibility of the structure of the monitor, the length and the height of housing 47 are not correspondingly minimized. The reason for deliberate extension of the height of housing 47 is to maximize, so far as is practicable, the thermal isolation of top thermocouple 59 from bottom thermocouple 63. The length of housing 47 is extended to increase the segregation of the hot air directed downwardly by the oven upon top thermocouple sensor 53 from other hot air (very likely at a different temperature) directed upwardly by the oven upon bottom thermocouple sensor 55.

When the monitor is riding through the oven with its side rails supported upon the articulating pins 66 of respective conveyor chains or on a metal mesh belt, it is desirable for the bottom surface of housing 47 to be at a level approximately one-sixteenth inch above the level of the tops of the articulating pins or belt (or whatever other "track" may be supporting the monitor.) Housing 47 may be mounted upon the under surface of the inverted channel of left rail 21, center rail 23, or right rail 25. For this purpose, a captive nut on the top of housing 47 may receive a screw passing through a hole in any of the above-mentioned rails. The depth of the flange of each of those rails should be such as to insure that the bottom surface of housing 47 is suitably placed in an "up-and-down" direction.

In general, the placement of the monitor in an "up-and-down" direction should be such that its horizontal "axis of symmetry" is as nearly as possible coincident with the horizontal axis of symmetry of a circuit board "for whose proper fabrication the monitor is responsible."

Moreover, as the monitor progresses through the oven, supported by the conveyor (whether chain or belt,) its position with respect to the conveyor should not be allowed to slip, in a fore-and-aft direction or in any other way. To this end, one or more protuberances may be provided from left rail 21 and right rail 25 to interlock with the respective chains.

In the oven, there may be at least two sources of heat transfer to the circuit board or to the monitor. One source is infra-red radiation from heating elements of the oven. Another source is by conduction from convective streams of hot air directed downward upon the board or the monitor from above, and other streams of hot air directed upward against the bottom of the board or monitor from below it. In either case, the heating rate is not likely to be uniform across the board and, in particular, the heating rate for the top surface of the board or monitor may not be equal to the heating rate for the bottom surface of the board or monitor. But satisfactory thermal profiling requires that temperatures on the top and on the bottom be measured accurately without appreciable interaction between respective sensors on the top and on the bottom of the board or monitor. In other words, so far as is possible, top thermocouple sensor 53 is to be thermally "decoupled" from bottom thermocouple sensor 55.

Figure 2:
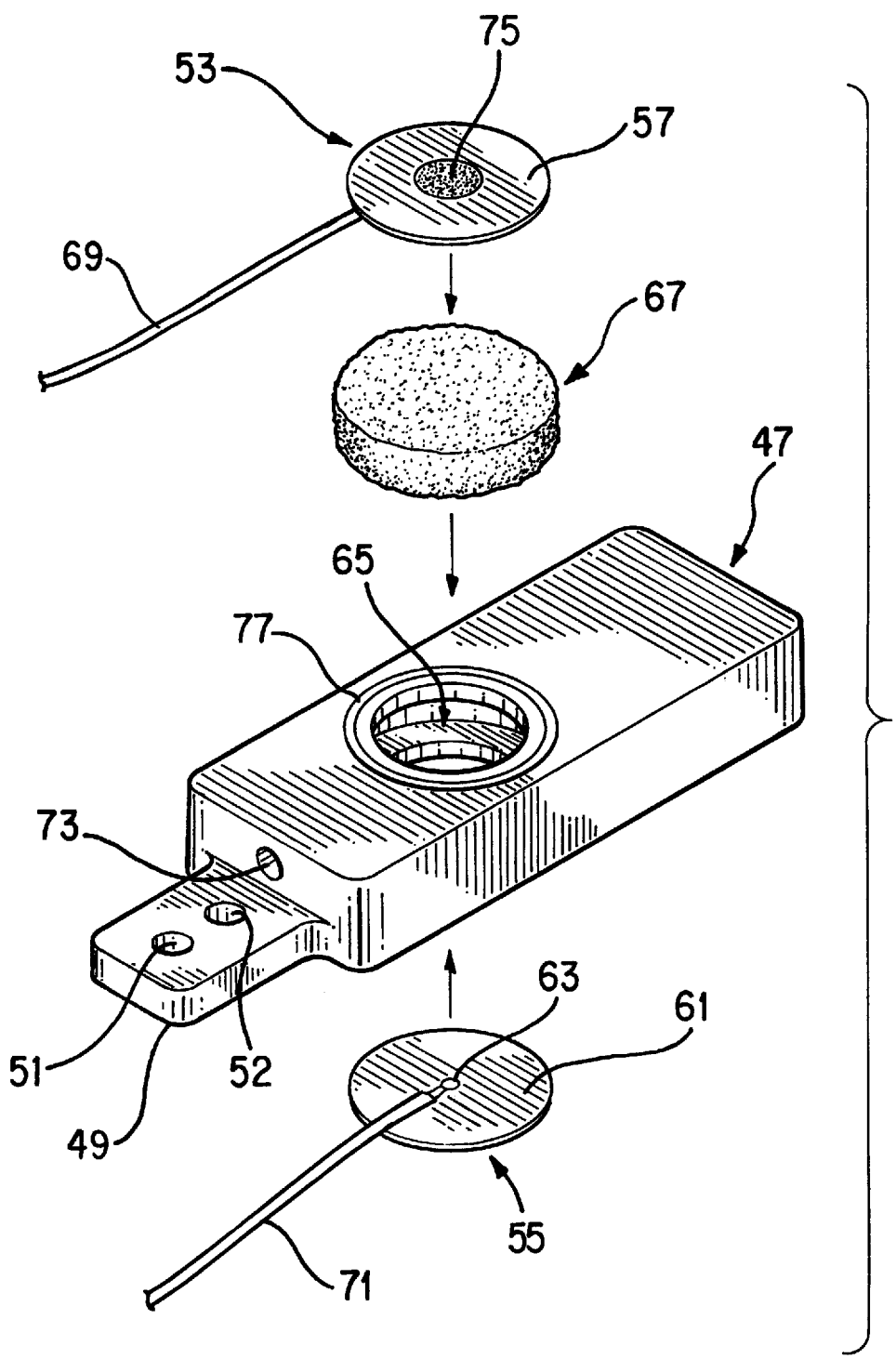
FIG. 2 is an exploded perspective view of a sensor assembly, including independent top and bottom thermocouples, which may be incorporated in multiple form into the monitor of FIG. 1.

It will be understood that the exploded perspective view of FIG. 2 illustrates a sensor assembly in its disassembled state. When it is assembled, an insulative disk 67 may be positioned within internal cavity 65 in such a way as substantially to fill it. Insulative disk 67 may be of fiberglass or other material of low thermal conductivity, and may have a diameter and height only slightly smaller than the diameter and height of internal cavity 65.

When insulative disk 67 has been positioned within internal cavity 65, top thermocouple sensor 53 is installed to cover the top opening in housing 47, whereas bottom thermocouple sensor 55 is installed to cover the bottom opening in housing 47. The top thermocouple leads 69 (from top thermocouple 59) and the bottom thermocouple leads 71 (from bottom thermocouple 63) are passed through a thermocouple-wire exit hole 73 in housing 47, and are extended to connect with, respective input terminals of the thermal profiler.

Referring again to FIG. 2 of the drawings, top thermocouple sensor 53 comprises top thermocouple 59 (obscured in FIG. 2) attached to top metallic disk 57, which may be of thin stainless steel. Preferably, the thermocouple junction should be welded or brazed to the metallic disk at or near its center point. While. top thermocouple 59 is "under," and protected by, top metallic disk 57, the "exposed" surface of top metallic disk 57 may have a spot of black coating 75 centered directly opposite the thermocouple and extending a few millimeters outward from the center point. The spot of black coating 75 serves to increase the thermal emissivity of its portion of top metallic disk 57 and, likewise, the absorptivity for infrared radiation from the oven heaters. This heightened absorptivity of top metallic disk 57 enhances the thermal "signal" transferred to top thermocouple 59 and, hence, the speed of its response, even to minor changes in the infra-red environment of the monitor. Bottom metallic disk 61 also has a spot of black coating for the same purpose.

The speed of response of the monitor to thermal changes within the oven is of the essence of this invention. This is one of the major advantages of the present invention over the "golden boards" of the prior art. The spot of black coating 75 contributes to that advantage. However, it is not an objective of the invention to provide a monitor which reacts to minor, high-frequency changes in the intra-oven environment which can be regarded as "thermal noise." Instead, the monitor serves to identify, evaluate, and record changes in the intra-oven environment which might warrant changes in set temperatures of any of the oven zones, or changes in conveyor speed, or changes in any of the other thermal parameters of the oven, or other processing enclosure.

When the "exploded" components shown in FIG. 2 are fully assembled, top metallic disk 57 rests in a top sensor-disk seating cavity 77 which circles the top opening of housing 47 and which has a diameter a few thousandths of an inch greater than that of top metallic disk 57. Top metallic disk 57 may be cemented to an annular sealing or shoulder area in top sensor-disk seating cavity 77 by means of high-temperature silicone rubber adhesive or its equivalent. The shoulder area, which is defined at its inner extent by the opening, is the outer surface of the housing between the opening and the perimeter of the sensor-disk seating cavity 77. The adhesive should have a minimum bond thickness of at least 0.002 inch in order that there shall not be excessive shear stress in the adhesive as top metallic disk 57 expands and contracts at a different rate than housing 47. This minimum bond thickness may be assured by providing a second shoulder 80 in housing 47 around the perimeter of sensor-disk seating cavity 77, The cemented seating of top metallic disk 57 in top sensor-disk seating cavity 77 is shown in FIG. 3 and FIG. 4 and FIG. 4(a), which illustrate clearly the adhesive 78 and the detail of the cemented seating joint. Also shown in those figures is a groove 79 formed in housing 47 around the extreme perimeter of top sensor-disk seating cavity 77. The purpose of groove 79 is to capture excess adhesive that may be squeezed out when top metallic disk 57 is pressed into place on the sealing area of top sensor-disk seating cavity 77. By capturing the excess adhesive in groove 79, a messy build-up of adhesive on the surface of housing 47 is prevented. To assure a minimum adhesive bond thickness of 0.002 inch, a small second shoulder 80 is provided around the inside edge of groove 79 When metallic disk 57 or 61 is pressed down into the bead of adhesive, second shoulder 80 assures that a minimum thickness of adhesive will be retained between the disk and the sealing area in sensor-disk seating cavity 77 or 81. If desired, an "O-ring" may be substituted for adhesive 78 between metallic disk 57 and second shoulder 80 or the sealing area in top sensor-disk seating cavity 77.

The above description of the installation and securing of the metallic disk has referred to top metallic disk 57 and top thermocouple 59. However, the installation of bottom metallic disk 61, with its bottom thermocouple 63, on an annular sealing area in a bottom sensor-disk seating cavity 81, will generally be symmetric with the top installation, about a plane bisecting housing 47 and parallel to its broad surfaces. Although the bottom portions of left, center, and right sensors 35, 37, and 39, respectively, could be made different from the respective top portions of those sensors, there is no apparent reason to do so. An O-ring may be used between bottom metallic disk 61 and the annular sealing area in bottom sensor-disk seating cavity 81.

There are many good reasons for the top and bottom of each of sensors 35, 37, and 39 to be identical with each other, and for the assembly of each of those sensors to be like the assembly of each of the others. Moreover, there is also every reason to array the sensors in comparable locations, differing only in a known way. For the purposes of this specification, the "known way" is to array left sensor 35, center sensor 37, and right sensor 39 in a straight line, and to provide that each such sensor shall have a top thermocouple sensor and a bottom thermocouple sensor which are identical except for the direction in which they "face."

Figure 5:
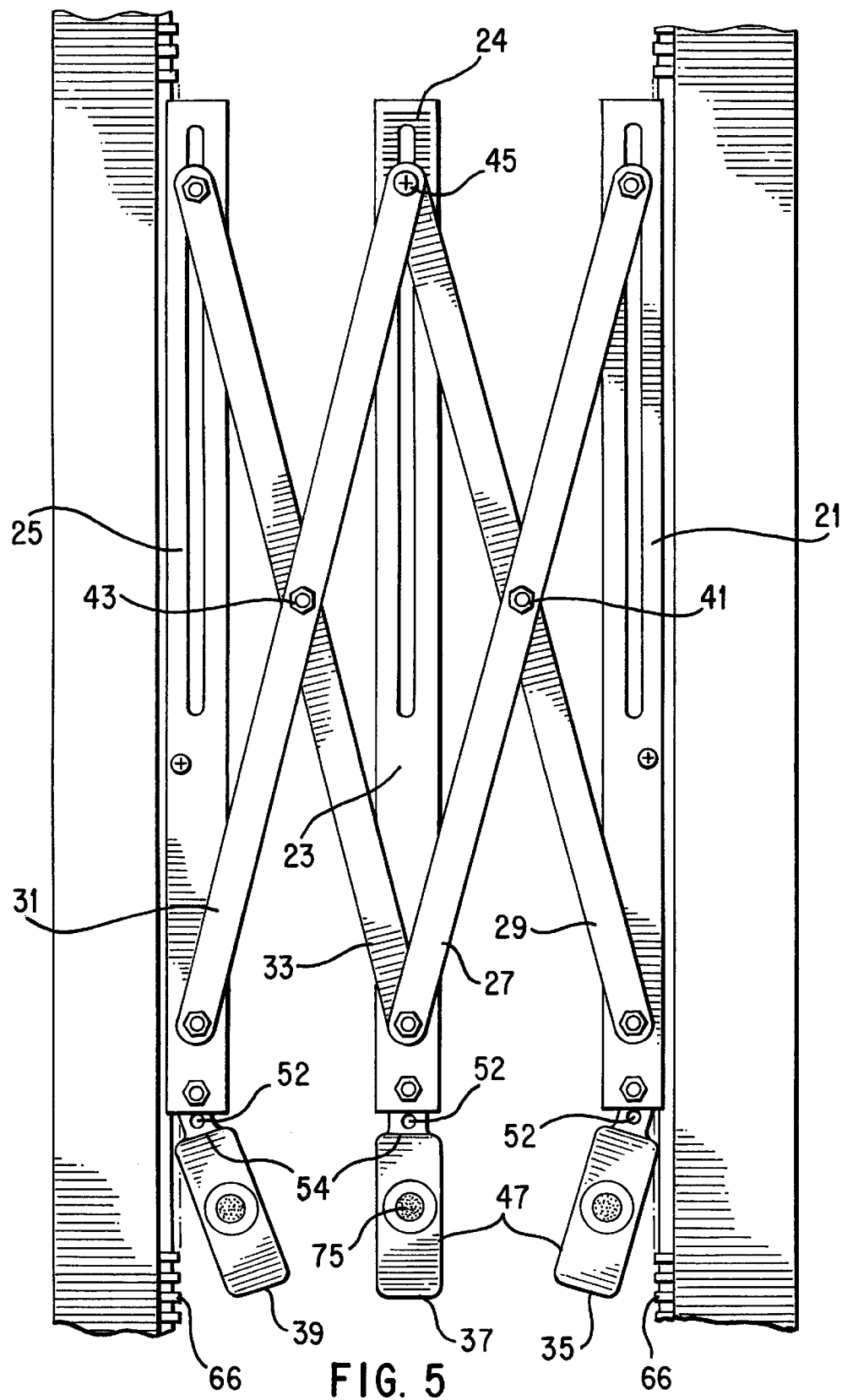
FIG. 5 is a plan view of the first configuration of temperature monitor as illustrated in perspective in FIG. 1, the monitor being supported on edge-rail conveyor chains, as in an oven.

Again, for the purposes of this description, it is contemplated that left rail 21 will ride through the oven on the articulating pins of the left chain of the conveyor, while right rail 25 will ride on the articulating pins of the right chain of the conveyor. The distance between the respective outer edges of left rail 21 and right rail 25 may be directly read in inches and/or metric measure by a scale 24 on center rail 23 as shown in FIG. 5. If the conveyor has a center chain, as some do, it is possible, although not necessary, that center rail 23 would ride on the center chain. Each outer side of left rail 21 and right rail 25 is constrained by its respective chain so that the monitor cannot rotate about a vertical axis. Alternatively, the three rails of the monitor may ride on the mesh belt of a conveyor. Moreover, the double linkage of scissor arms has freedom of motion only in a transverse direction and, when fastener 45 is set and locked, no freedom of motion at all except to progress through the oven on the articulating pins of the conveyor. So, at any given instant, sensors 35, 37, and 39 will have progressed exactly the same distance through the oven. And this is why it is feasible to plot thermal profiles as functions of time.

Still further, for the purposes of this description, it is expected that the components on a circuit board will fill most of the area on one or both sides of the board. Otherwise, the board would have been made smaller. But generally a "margin" of at least one-quarter inch is left on opposing sides. The margin is free of components in order that the board may be supported by the articulating pins without allowing the pins to interfere with the components on the board. In general, it is an objective of this monitor to sense temperatures at the median, or center line of the oven, and also at the extreme left and extreme right of that portion of the passageway through which components might pass when circuit boards are processed. The temperature of the extreme edge of the substrate of the board may be of little interest, but the temperatures of the components nearest to that edge have great significance because they must satisfy the specifications of the thermal profile just as do the components arrayed along the median of the board.

Figure 6:
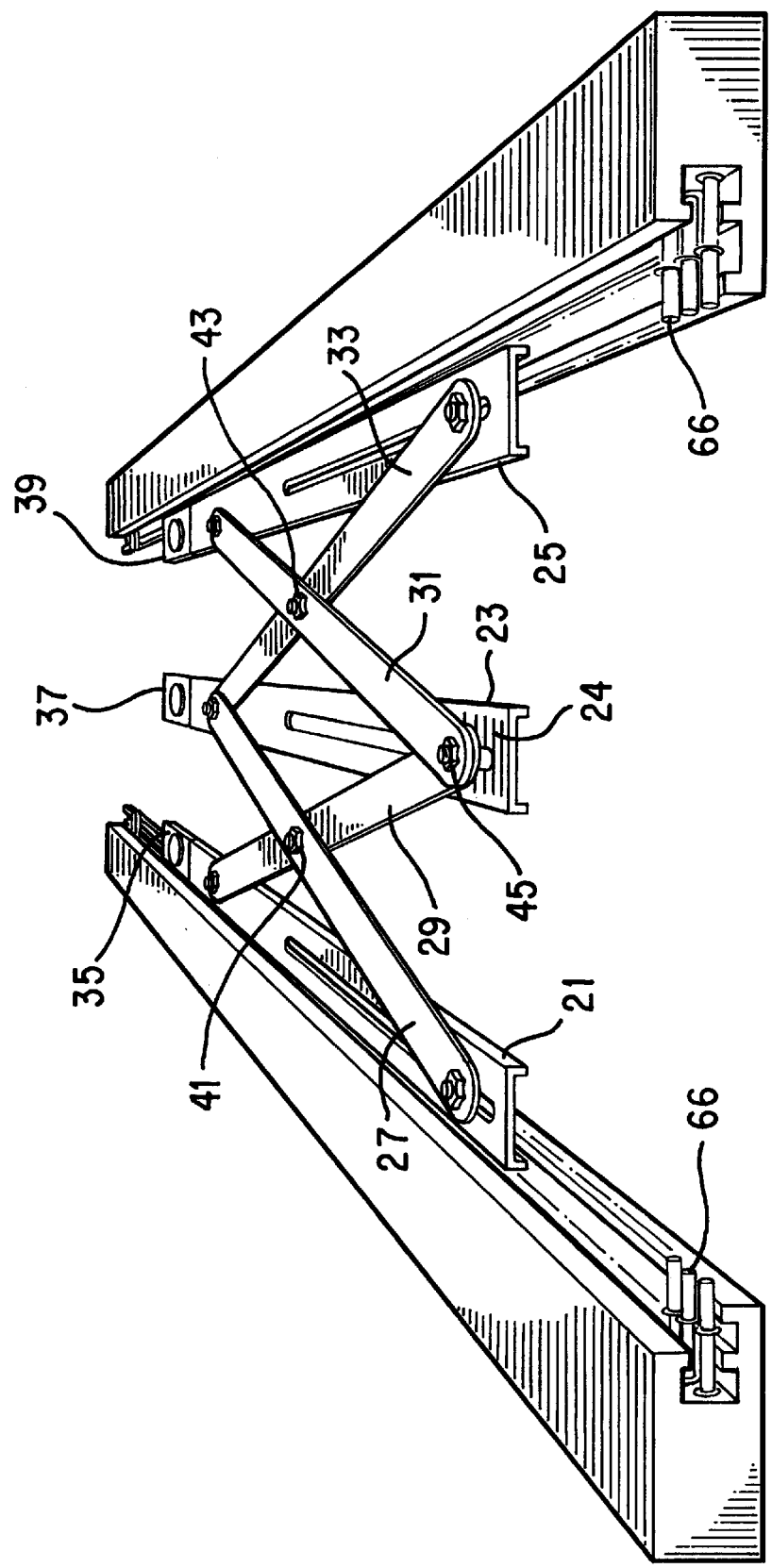
FIG. 6 is a perspective elevation view of the first configuration of temperature monitor resting upon the inwardly-extending articulating pins of an edge-rail conveyor.

In the perspective elevation view of FIG. 6 of the drawings, the respective positions of left sensor 35 and right sensor 39 are such that their respective "black spots" approach positions directly over the ends of the articulating pins of the conveyor. If those positions are beyond the locus of components on a board, then the monitor should take cognizance of that relative position—as indeed it does.

Left rail 21 and right rail 25 must be extended by the double-scissors-arms mechanism and locked by fastener 45 so that those rails are securely carried by the articulating pins of the oven conveyor. The aforementioned rails must be set as far apart as permitted by the articulating pins of the oven conveyor. But the components whose temperature is of interest may be arrayed somewhat inboard from the outer edges of the rails as shown in the plan view of FIG. 5. So, in accordance with the invention, provision is made for pivoting inward each of left sensor 35 and right sensor 39. This is possible because the width of mounting tang 49 is less than the spacing between the channel flanges of left rail 21 and right rail 25. The adjustment is made by loosening the screw fastener through first mounting hole 51, pivoting the sensor to its desired angle, and tightening the screw fastener. For some applications it may be important to assure that left sensor 35 and right sensor 39 do not pivot, but remain parallel with left rail 21 and right rail 25 respectively. This can be achieved by attaching the sensors to their respective rails with the screw fastener through a second mounting hole 52, which positions a first shoulder 54 in close proximity to the squared end of the rail, thus preventing housing 47 from pivoting about the screw fastener.

As has already been mentioned, an important feature of the monitor in accordance with this invention is its ability to differentiate between topside and bottom-side heating. Ideally, top thermocouple sensor 53 would be thermally isolated from bottom thermocouple sensor 55. The degree of success in approaching this ideal is a function of the "thermal impedance" between those two sensors. One way to maximize the thermal impedance is to make the thickness of thermally insulative housing 47 reasonably great. The width of housing 47 may be constrained by the need to be able to "collapse" the monitor for passage through a narrow oven portal on conveyor chains which are set only a few inches apart.

Another way to maximize the thermal impedance is to use the undercut internal cavity 65, which has already been described. The cavity, formed in the material of housing 47, increases the thermal path length between the top and bottom thermocouple sensors of left sensor 35, center sensor 37, or right sensor 39 respectively. A suggested length for internal cavity 65 is one inch. At a higher manufacturing cost, the thermal path length could be increased by increasing the length of internal cavity 65 beyond one inch. As has already been explained, the presence of insulative disk 67 within internal cavity 65 minimizes convective and radiative heat transfer between top metallic disk 57 and bottom metallic disk 61.

The design of each sensor permits of some flexibility. For instance, the material of top metallic disk 57 and bottom metallic disk 61 is desirably stainless steel having a thickness of approximately 0.010 inch. However, each disk is part of the series chain which determines the thermal impedance between top thermocouple 59 and bottom thermocouple 63. The disk also participates in the determination of the "time constant" of response of each thermocouple. If it should be found that the speed of response of a thermocouple is so fast that undesired high-frequency thermal transients are being recorded in the thermal profiler, then the thermal time constant could be increased by increasing the thickness of top metallic disk 57 and bottom metallic disk 61. While sensitivity of response is desirable, it will be understood that undesirable thermal noise can be eliminated by increasing the thermal time constant of each sensor. On the other hand, the thermal time constant is decreased by the blackening of spots on the metallic disks corresponding to the respective thermocouples thereunder, as already described.

The "thermal mass" of thermocouple sensors 53 and 55 may be designed to "mimic" the thermal response of an average-sized component on the circuit board. Thus, the sensors do not respond appreciably to high-frequency thermal noise, which is meaningless so far as the desired function of the monitor is concerned. However, for certain applications, it may be desirable to increase the thermal mass of the sensors to mimic the response of larger components on the board.

Figure 7:
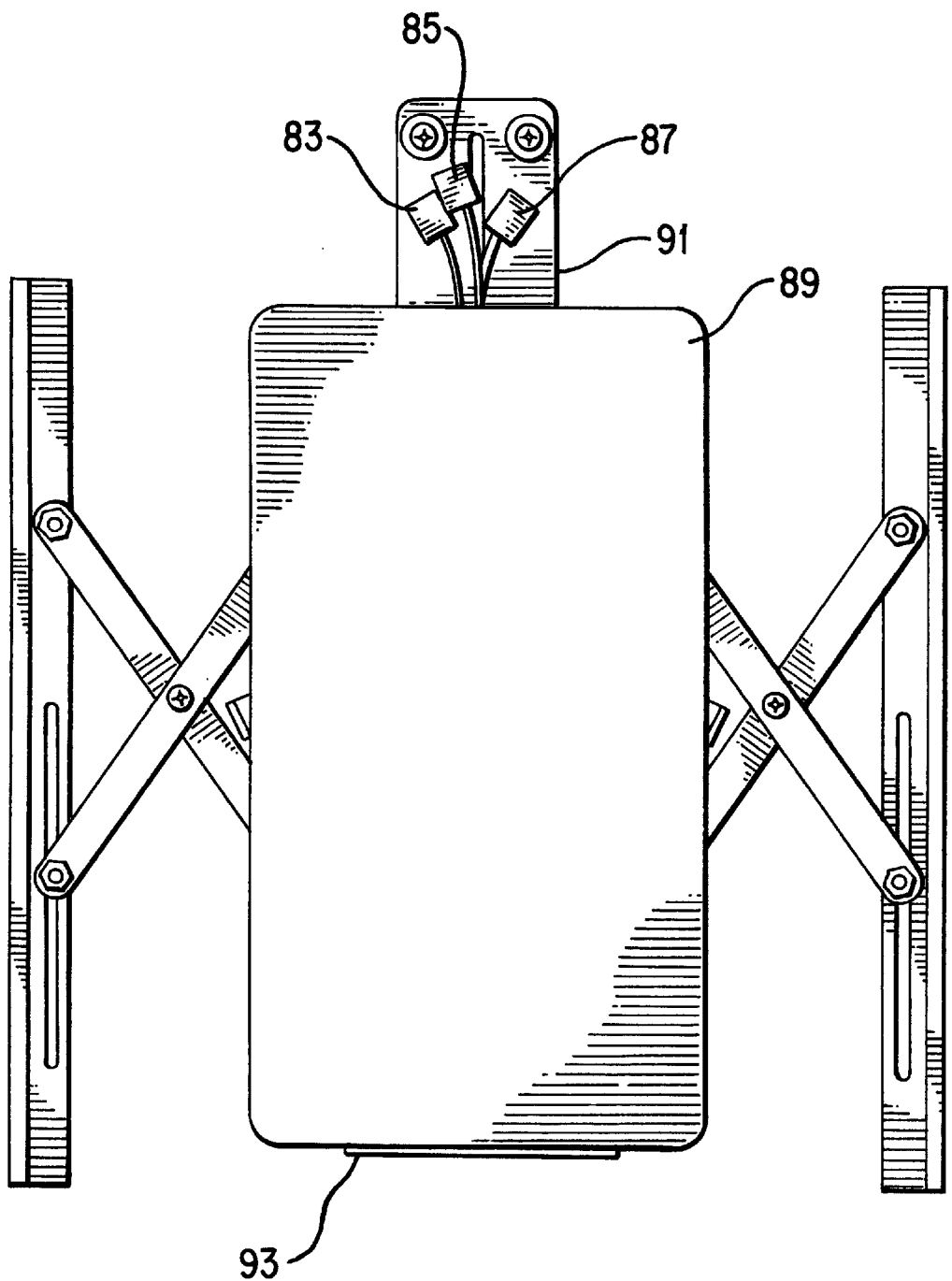
FIG. 7 is a plan view of one configuration of carrier in accordance with U.S. Pat. No. 5,739,443—Saunders, showing the way in which a thermal profiler supported by the carrier may be connected through electrical leads to the respective thermocouples of the process temperature monitor of the present invention.

Turning to other matters of design, top thermocouple leads 69 and bottom thermocouple leads 71 all pass through thermocouple-wire exit hole 73 in housing 47 and may terminate in standard "Type-K" thermocouple connectors 95 which, in turn, couple to the input terminals of the thermal profiler. FIG. 7 of the drawings shows a first profiler-input terminal 83, a second profiler-input terminal 85, and a third profiler-input terminal 87 of a thermal profiler 89, which rides through the oven on an elongated base 91 of a carrier 93, just behind the monitor. The profiler may have six or more input terminals rather than just three.

Along with top thermocouple leads 69 and bottom thermocouple leads 71, I may pass through exit hole 73 a very-small-diameter stainless-steel tube to permit pressure equalization between the interior and exterior of housing 47 as temperatures change both inside and outside the housing. Exit hole 73 may then be sealed with silicone-rubber cement, epoxy, or other high-temperature sealant. Although the preferred material for housing 47 is Durostone high-temperature fiberglass-reinforced epoxy resin, other equivalent temperature-resistant materials may be employed.

Returning to the mode of operation of the monitor in accordance with this invention, an objective is to have each sensor of the monitor respond thermo-electrically in a way that is substantially similar to the way in which an instrumented average-sized component on a circuit board would respond, but very specifically as to time and location in the oven. The speed of the conveyor is assumed to be settable, but uniform during any series of tests. Accordingly, time and position in the direction of propagation of the board are interchangeable. But transverse position, and the distinction between "over-and-under" are of great importance in the operation of the monitor and method of this invention. For some time, it has been recognized that the oven-conveyor chains act as heat sinks, drawing heat away from the components near the lateral edges of the board while the temperature of the board is in the ramp-up mode in the initial zones and in the peak zone of the oven. But even some experts in the field have not realized the substantial divergence between the temperatures at corresponding points on the top and on the bottom of the board. The following paragraphs will explain the importance of this invention in identifying and recording that divergence.

Figure 8:
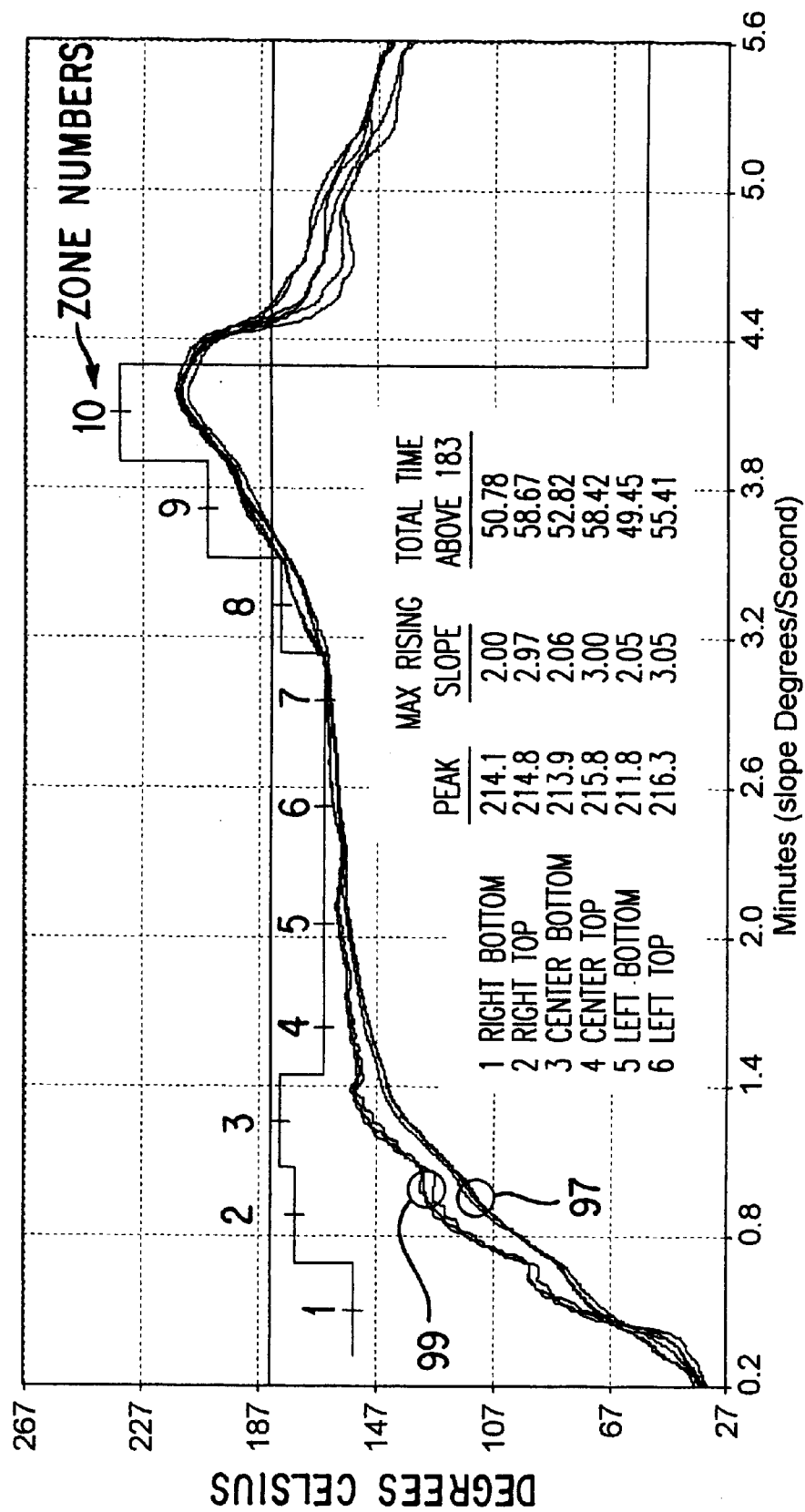
FIG. 8 is a first set of profiles of temperature as a function of time for three top thermocouples and three bottom thermocouples of a temperature monitor passing through a ten-zone oven, illustrating divergence of the profiles especially in the region of temperature "ramp-up;"
Figure 9:
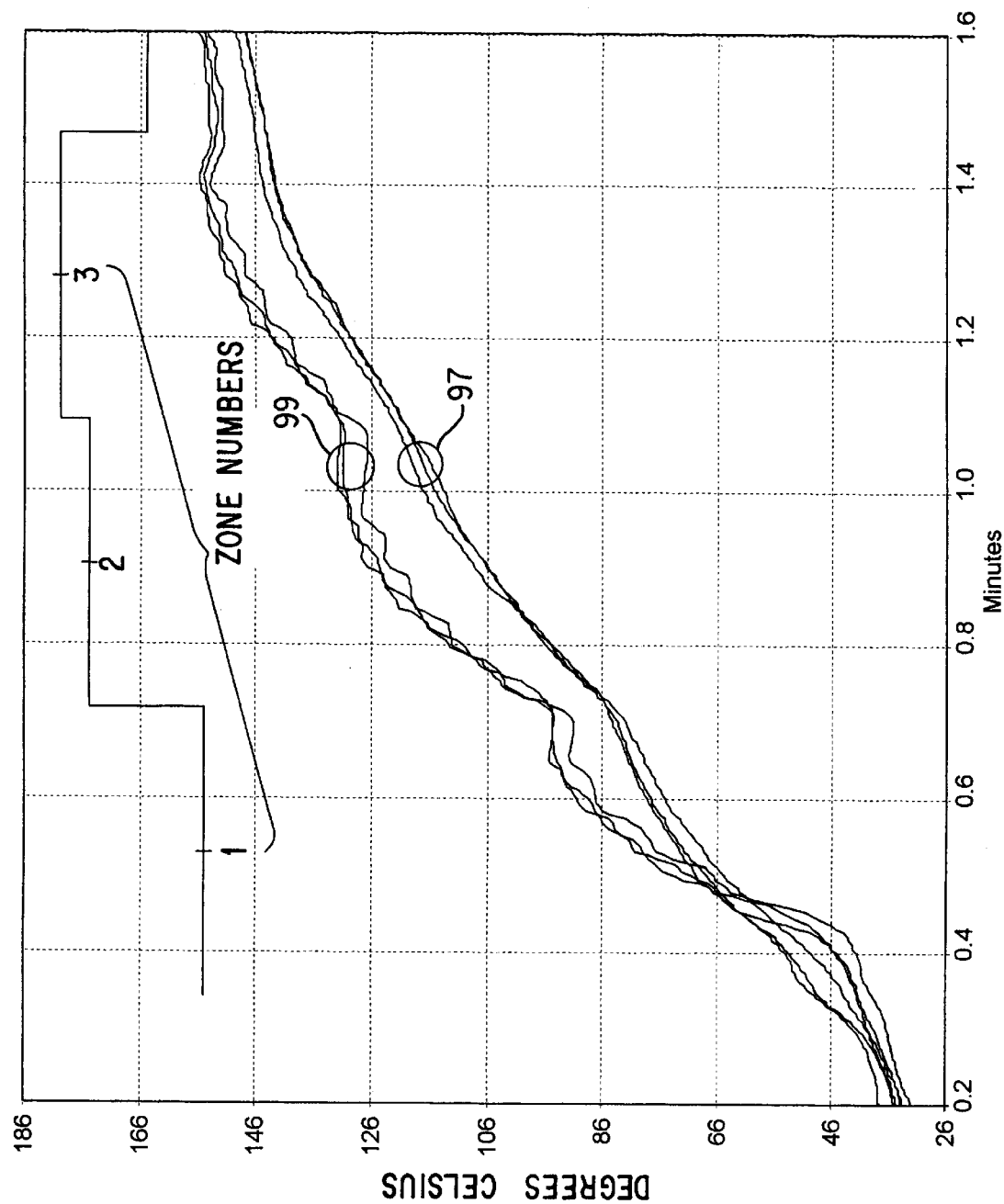
FIG. 9 is an enlargement of the ramp-up portion of the first set of profiles of FIG. 8.

FIG. 8 is a first set of profiles for a monitor having three top thermocouples and three bottom thermocouples. FIG. 9 is an enlargement of the ramp-up portion of the profiles of FIG. 8. As shown more clearly in FIG. 9, the first bottom ramp-up profiles 97 of the temperatures indicated by the three respective bottom thermocouples are much smoother than the first to) ramp-up profiles 99 for the three respective top thermocouples. There seems to be a mini-step of temperature for each top thermocouple at each transition point between zones of the oven. But, not so for the temperatures of the bottom thermocouples. No doubt, this divergence is a function of the heating structure of the oven. But it is a real divergence which has a bearing on maximum ramp-up slope, among other things.

The profiles of FIG. 8 and FIG. 9 were taken from a monitor riding on a steel-mesh conveyor belt rather than on the articulating pins of conveyor chains. Accordingly, the large thermal mass of the cool conveyor belt acts as a heat sink which draws heat away from the bottom thermocouples of the monitor. Therefore, besides lacking the "mini-steps" of temperature which are manifested by first top ramp-up profiles 99, first bottom ramp-up profiles 97 rise more slowly in the first three zones of the oven, where otherwise the large temperature differential causes the most rapid heating. Again, the large thermal mass of the belt smooths out the "steps" that are apparent in first top ramp-up profiles 99.

FIG. 8 and FIG. 9 show that, for the first top ramp-up profiles 99, the maximum slope in terms of degrees Celsius temperature rise per minute of passage time in the oven is nearly fifty percent greater than for first bottom ramp-up profiles 97. However, when the monitor has passed the "temperature-soak" phase in the mid-zones of the oven and reached the "peaking" phase in zones 9 and 10, the top and bottom temperatures (as illustrated in FIG. 8) are rather close together.

Figure 10:
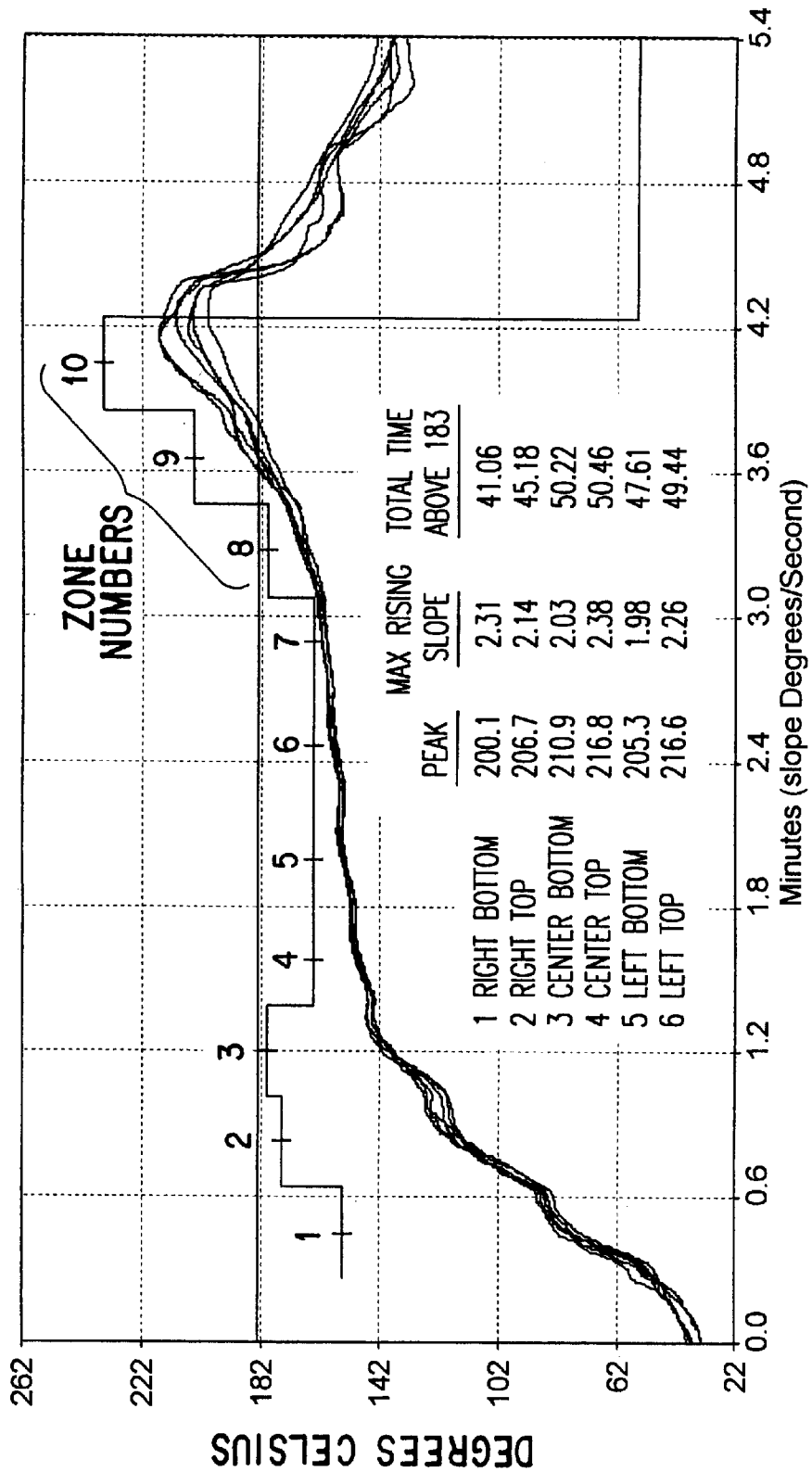
FIG. 10 is a second set of profiles of temperature as a function of time for three top thermocouples and three bottom thermocouples of a temperature monitor passing through a ten-zone oven, illustrating divergence of the profiles especially in the region of peak temperature.
Figure 11:
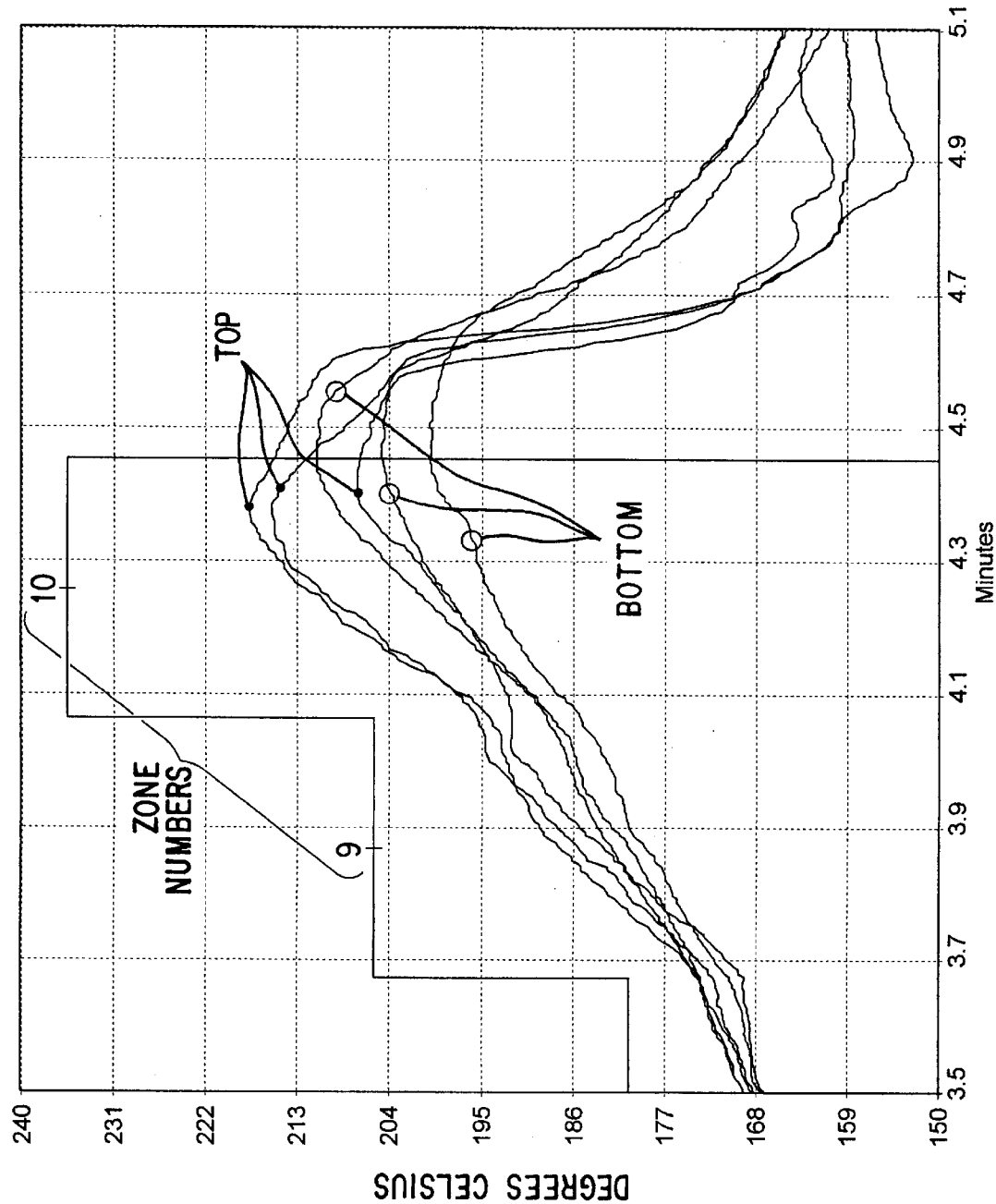
FIG. 11 is an enlargement of the peak portion of the second set of profiles of FIG. 10.

Turning to FIG. 10 and FIG. 11, the scene changes in that the monitor is, once again, riding on the articulating pins of an edge-rail conveyor rather than on a steel-mesh conveyor belt as in FIG. 8 and FIG. 9. The monitor is more than an inch above the chilling effect of the steel-mesh conveyor belt, and is approximately equidistant from the top and bottom heaters of the oven. As a result, the "mini-steps" re-appear in the ramp-up phase of all the profiles, top and bottom, and the profiles are fairly close together except at the peaking phase in about the tenth zone of the oven.

In the ninth and tenth zones, when peak heating power is suddenly applied to melt the solder, the thermal mass and conductivity of the edge-rail conveyor become important in that the conveyor drains away heat which would otherwise raise the temperatures of left sensor 35 and right sensor 39. However, the heat-sinking effect of the edge rails is not equal. It is true that both rails conduct heat from a high-temperature zone of the oven through the rail-support material, which is often aluminum, into a cooler adjacent zone. Also, both edge rails experience the heat-sinking effect of the conveyor chain as it moves from a cooler zone into a hotter zone.

Nevertheless, an even greater effect results from the fact that one edge rail is mounted directly on an exterior wall, while the second rail is laterally adjustable across the width of the oven to produce a separation between rails equal to the width of the circuit board being processed. Consequently the heat-sinking effect of the fixed rail is greater than that of the adjustable rail, which is surrounded by convective heating. This difference in heat-sinking effect between the two rails increases as the oven zone temperature increases, which of course increases the temperature differential between the fixed rail and the ambient temperature outside the oven.

This unequal heat-sinking by the edge rails can be observed in FIG. 10, using data from a set-up in which the right rail is fixed. The result is that the right sensor shows the lowest peak temperature for both its top and bottom thermocouples. Due to its close proximity to the adjustable rail, the left bottom thermocouple peak temperature is also lower than that of the center bottom thermocouple, whereas the left top and center top sensors indicate essentially the same temperature.

FIGS. 8 through 11 illustrate the importance of independently sensing top and bottom temperatures. For example, FIG. 10 and FIG. 11 show a 16.7° C. temperature spread, which could easily cause inadequate heating of large components in the cool areas of the board or overheating of small components in the hot areas of the board. This significant temperature spread would be largely invisible to conventional thermocouples soldered to particular points on a circuit board.

Figure 12:
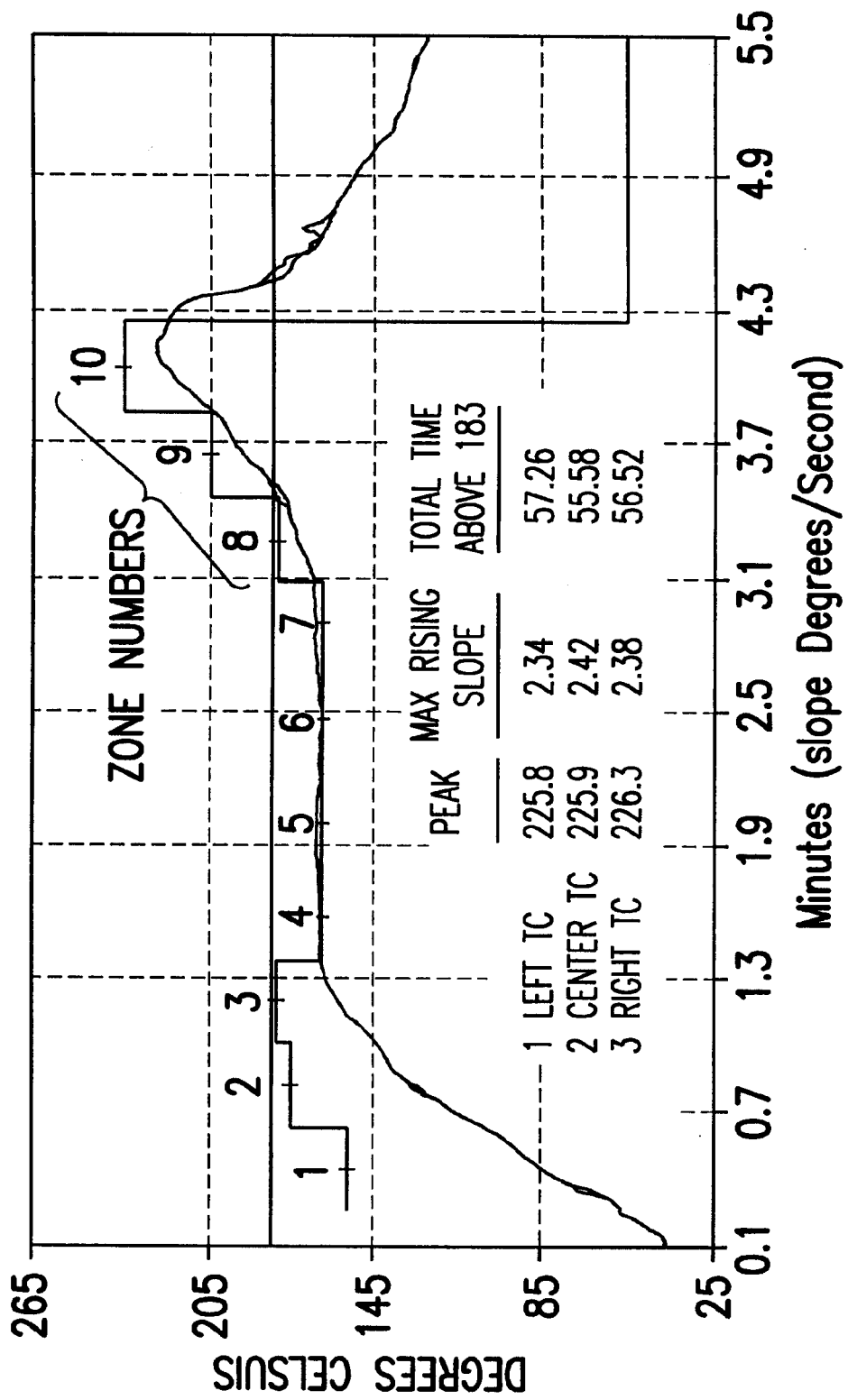
FIG. 12 is a third set of profiles of temperature as a function of time for three conventional wire thermocouples attached to the top surface of a circuit board passing through a ten-zone oven, illustrating the common similarity of these profiles and also their differences from the temperature-monitor profiles of FIG. 8 and FIG. 10 respectively.

Turning now to FIG. 12 of the drawings, we see the profiles of temperature as a function of time for three conventional thermocouples soldered to different points on one surface of a circuit board. Unlike the profiles of FIG. 8 through FIG. 11, the profiles of FIG. 12 exhibit very little divergence. This lack of significant divergence is attributable to the fact that the thermocouples are all sensing the combined effect of top and bottom heating of the circuit board, rather than its electronic components, great or small as the case may be. This is the way in which prior-art "golden boards" operate. It is now very apparent why the monitor in accordance with this invention is so much more effective than "golden boards" in detecting and measuring slight changes in top-or-bottom-side heating. Again, it will be understood that all profiles of FIG. 8 through FIG. 12 were taken in the same oven with the same zone temperature settings and the same conveyor speed.

Figure 13:
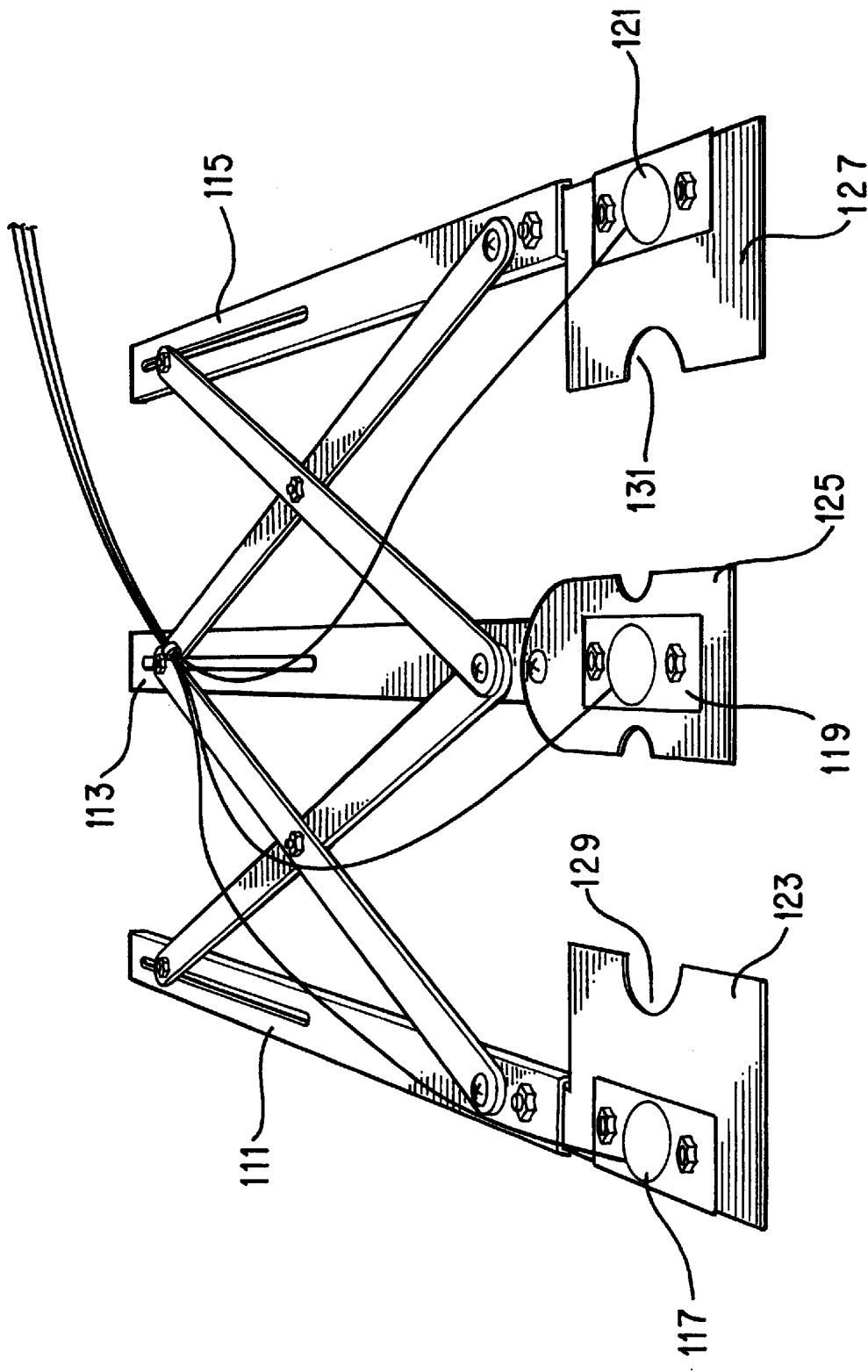
FIG. 13 is a perspective view of a second configuration of temperature monitor, in accordance with this invention, with the addition of baffles to augment the plan-view area of each sensor of the monitor, whereby to segregate the downwardly-directed hot-gas output of the top heaters from the upwardly-directed hot-gas output of the bottom heaters.
Figure 14:
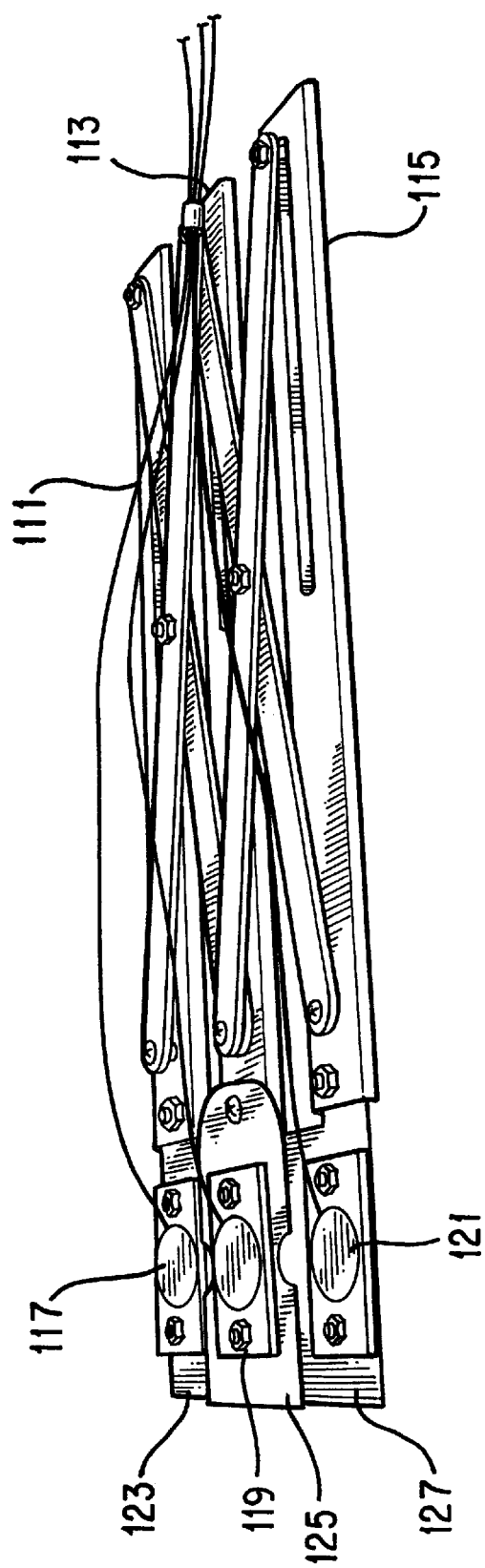
FIG. 14 is a perspective view of the second configuration of temperature monitor, but in its compact mode.

FIG. 1 and FIG. 5 of the drawings illustrate a first configuration of the monitor in a somewhat expanded mode, as if the monitor were adjusted for passage through an oven having a reasonably broad portal for receiving circuit boards of substantial size. We now turn to FIG. 13 and FIG. 14 of the drawings, which illustrate a second configuration of the monitor, in which baffles have been added to augment the plan-view area of each sensor of the monitor. FIG. 13 shows the second configuration in a somewhat-expanded mode, whereas FIG. 14 shows the same second configuration in a "compact" mode to permit passage of the monitor through an oven having a narrow portal or passageway, as for relatively small circuit boards.

Once again, the second configuration of monitor has a first rail 111, a second rail 113, and a third rail 115 which are connected together by an expandable double-scissors linkage as in the first configuration. Further, as in the first configuration, first rail 111 carries at one end a first sensor 117; second rail 113 carries at one end a second sensor 119; and third rail 115 carries at one end a third sensor 121. But, in addition, first sensor 117 carries a first baffle 123; second sensor 119 carries a second baffle 125; and third sensor 121 carries a third baffle 127. First baffle 123 and third baffle 127 are deployed in a plane slightly below the plane defined by the webs of the channels of first rail 111, second rail 113, and third rail 115. Second baffle 125, on the other hand, may be deployed in a plane slightly above the aforementioned plane defined by the webs of the channels.

Thus, when the linkage of the monitor is collapsed into its compact mode, the inboard portions of first baffle 123 and third baffle 127 may assume positions under second baffle 125 without coming into contact with it. The respective inboard portions of each of first baffle 123 and third baffle 127 may have respective first and second generally-semi-circular cut-outs 129 and 131 which enable first rail 111 and third rail 115 to approach closely to second rail 113 without having first baffle 123 and third baffle 127 interfere with, or impact, second sensor 119.

Once again, the purpose of the baffles is to "thermally decouple" the top thermocouple sensor 53 from the bottom thermocouple sensor 55 of each sensor of the monitor. As has already been explained, there may be several sources from which hot air, or infrared radiation, or both, is directed at each sensor of the monitor from above, below, or even from the side as the monitor progresses through the oven. However, the primary heat sources are above and below the monitor, and they are often unequal in intensity and in convective effect. Therefore, top thermocouple sensor 53 of each sensor should presumably "report" a different temperature than bottom thermocouple sensor 55 of each sensor of the monitor. Baffles 123, 125, and 127 serve to isolate the effect of top and bottom heat sources on the top and bottom thermocouple sensors. Accordingly, the tendency for top and bottom convective flow to mix is impeded and, to the greatest possible extent, the respective "reports" of the top and bottom thermocouple sensors are prevented from being blurred one by the other. Thus is fulfilled an objective which was never even recognized by the designers of the prior-art "golden boards."

The most-favored configurations of monitor and the most-favored steps of the corresponding method of operation in accordance with the invention have been fully described. Various changes may be made in the structure of the monitor and in its mode of operation without departing from the scope of the invention. Accordingly, the invention is defined only by the following claims and their equivalents.

I claim:

1. A monitor for sensing respective temperatures at a plurality of points at least a first one of which is separated by a distance having a finite constituent in a predetermined direction from at least one other point, said monitor comprising:
    (a) first elongated supporting structure having a leading end and a trailing end,
    (b) a first sensor mounted on the leading end of said first elongated supporting structure,
    (c) second elongated supporting structure having a leading end and a trailing end,
    (d) a second sensor mounted on the leading end of said second elongated supporting structure,
    (e) third elongated supporting structure having a leading end and a trailing end,
    (f) a third sensor mounted in the leading end of said third elongated supporting structure,
    (g) a first pair of scissor arms pivotally linking said first elongated supporting structure to said second elongated supporting structure to maintain parallelism between them,
    (h) a second pair of scissor arms pivotally linking said second elongated supporting structure to said third elongated supporting structure to maintain parallelism between them, and
    (i) means for guiding respective ones of said leading means along scissor arms to form an orderly group exiting said monitor,
    wherein the first, second and third sensors each comprise a structural housing of temperature-resistant material characterized by appreciable thickness in said predetermined direction, a first thermocouple mounted at a respective first location on said structural housing for sensing temperature at a respective first point, a second thermocouple mounted at a respective second location on said structural housing and separated from said respective first location by a distance having a finite constituent in said predetermined direction for sensing temperature at a respective other point, and means for leading respective signals from said respective first and second thermocouples to recording instrumentation.

2. A monitor in accordance with claim 1, further including a thermal profiler connected to said orderly group of leading means deriving respective signals from said first thermocouple and said second thermocouple of each of said first sensor, said second sensor, and said third sensor of said monitor.

3. A monitor in accordance with claim 1 in which said first and second pairs of scissor arms are adjustable to permit the distance between said first elongated supporting structure and said third elongated supporting structure to be set at will.

4. A monitor in accordance with claim 3, further including fastening means associated with said second elongated supporting structure for temporarily fixing said distance between said first elongated supporting structure and said third elongated supporting structure.

5. A monitor in accordance with claim 4, further including a scale on said second elongated supporting structure for indicating the distance of separation between the outer edge of said first elongated supporting structure and the outer edge of said third elongated supporting structure.

6. A monitor in accordance with claim 1 in which said first sensor is pivotable with respect to said first elongated supporting structure.

7. A monitor in accordance with claim 1 in which said third sensor is pivotable with respect to said third elongated supporting structure.

8. A monitor in accordance with claim 1 in which each of said first sensor, said second sensor, and said third sensor has a heat baffle extending outwardly from said sensor in a plane substantially parallel to the plane defined by said first, second, and third elongated supporting structures.

9. A monitor in accordance with claim 8 in which the respective heat baffles extending outwardly from said first sensor and said third sensor are arrayed in substantially the same plane.

10. A monitor in accordance with claim 9 in which the plane of the respective heat baffles extending outwardly from said first sensor and said third sensor does not coincide with the plane of the heat baffle extending outwardly from said second sensor.

11. A monitor in accordance with claim 8 in which each of the baffle extending outwardly from said first sensor and the baffle extending outwardly from said third sensor has a cut-out to prevent it from covering said second sensor.

12. A method for monitoring process temperatures in the mass soldering of electronic components on a circuit board in a multi-zone oven having a conveyor for carrying said circuit board through said oven, said method comprising the steps of:

(a) attaching thermocouples at critical locations on a typical assembled circuit board and connecting said thermocouples to respective input terminals of a thermal profiler which is to accompany said circuit board through said oven, (b) repeatedly passing said typical assembled circuit board and said thermal profiler through the soldering process by means of said conveyor, (c) adjusting the speed of said conveyor and the set temperatures for respective zones of said oven until an optimum thermal profile is established for said typical assembled circuit board, (d) disconnecting said thermocouples from said thermal profiler and connecting said thermal profiler to a monitor having plural thermocouples, (e) passing said thermal profiler and said monitor through said oven without changing its set temperatures or the speed of said conveyor, (f) establishing in permanent memory a reference profile derived from each of said thermocouples of said monitor as a function of time or of location in said oven, (g) at a later time, passing said thermal profiler and said monitor through said oven on said conveyor, (h) recording and plotting the current thermal profile of said oven as a function of time or of location in said oven, (i) comparing said current thermal profile with said reference profile, and (j) repeating steps (g), (h), and (i) while adjusting respective set temperatures of said zones until said current thermal profile substantially matches said reference profile.

13. A sensor for sensing temperatures in an oven, comprising:

a housing having a generally rectangular body with a pair of opposing major surfaces, a pair of opposing minor surfaces and a pair of opposing end surfaces, the body also having an interior surface that defines a cavity within the body;

a first of the pair of major surfaces having a first opening defined therein and a second of the pair of major surfaces having a second opening defined therein, the first and second openings each communicating with the cavity;

a first of the pair of end surfaces having a third opening defined therein that communicates with the cavity;

first and second recessed shoulder areas extending outwardly from the respective first and second openings;

first and second metallic disks seated in the respective first and second shoulder areas, the disks having respective inner surfaces that generally face inwardly toward the cavity when the disks are seated within the respective shoulder areas;

first and second thermocouples attached to the respective inner surfaces of the first and second disks and independently operable to sense temperatures of the respective inner surfaces;

first and second leads attached to the respective first and second thermocouples and through which signals are transmitted, the first and second leads extending outwardly through the third opening; and a mounting portion extending from the first end surface and allowing the sensor to be mounted to a supporting structure, wherein the seating of the first and second disks within the respective first and second shoulder areas assists in preventing contaminants from entering the cavity of the body and contacting the first and second thermocouples, and wherein one surface of the mounting portion is generally coplanar with one of the first and second exterior surfaces of the housing.

14. A sensor in accordance with claim 13 in which each of said first thermocouple and said second thermocouple is fabricated by welding together one end of two unlike metallic wires and forming said wires adjacent said welded joint into a loop and then silver-soldering said loop near the midpoint of one side of the respective first and second disks.

15. A sensor in accordance with claim 13 in which each of said first thermocouple and said second thermocouple is fabricated by welding together one end of two unlike metal wires aid forming said wires adjacent said welded joint into a loop and then silver-soldering said loop near the midpoint on one side of the respective first and second disks.

16. The sensor of claim 13, wherein the first and second openings are aligned along a common axis, the third opening defines an axis that is offset at an angle from the common axis, and the third opening with the first and second leads extending therethrough is sealed with sealant.

17. The sensor of claim 13, further comprising insulative material occupying the cavity between the inner surfaces of the first and second disks.

18. A sensor in accordance with claim 17, wherein the insulative material is an insulative disk within said cavity.

19. The sensor of claim 13, wherein the seating between the first and second disks and the respective first and second shoulder areas is enhanced by adhesive applied around the first and second disks.

20. The sensor of claim 13, wherein the inner surfaces of the first and second disks are separated from respective outer surfaces by respective first and second disk thicknesses, and wherein the first and second disk thicknesses are sufficiently small such that first and second inner surface temperatures sensed by the respective first and second thermocouples closely approach respective temperatures of the first and second outer surfaces when the sensor is in operation.

21. The sensor of claim 20, wherein the housing is dimensioned such that a distance separating the first inner surface from the second inner surface is at least five times the disk thickness of the first disk or the second disk.

22. The sensor of claim 13, wherein the mounting portion includes at least one through hole for receiving a fastener to attach the sensor to an elongated supporting structure.

23. The sensor of claim 13, wherein the body has a length defined by the first and second surfaces and a width, and wherein the length is greater than the width, the greater length of the body serving to lessen the effects of heat directed primarily upon the second surface from influencing the temperature of the first disk and vice-versa.

24. The sensor of claim 13, wherein the first and second openings are generally circular and aligned along a common axis and the cavity has a dimension greater than respective diameters of the first and second openings, and wherein junctions between the first and second openings and the cavity define respective first and second undercut areas, the undercut areas serving to increase the thermally conductive heat path between the first inner surface of the first disk and the second inner surface of the second disk.

25. The sensor of claim 13, further comprising first and second o-rings respectively interposed between the first disk and the first shoulder area and the second disk and the second shoulder area.

26. The sensor of claim 13, wherein at least the first thermocouple is attached near a midpoint of the first inner surface of the first disk.

27. The sensor of claim 13, wherein at least the first thermocouple is attached to the first inner surface by silver soldering.

28. The sensor of claim 13, wherein at least the first disk has a blackened portion on an outer surface opposite the first inner surface and the first thermocouple.

29. The sensor of claim 13, wherein at least the first thermocouple is attached to the first inner surface by welding.

* * * * *

UNITED STATES PATENT AND TRADEMARK OFFICE
CERTIFICATE OF CORRECTION

PATENT NO. : 6,402,372 B1
DATED : June 11, 2002
INVENTOR(S) : Roger I. Saunders

It is certified that error appears in the above-identified patent and that said Letters Patent is hereby corrected as shown below:

<u>Title page,</u>
Item [56], References Cited, OTHER PUBLICATIONS,
"Leafle" should read -- Leaflet --.
"prior to 8/30/1999," should read -- (prior to 8/30/1999). --.

<u>Column 9,</u>
Line 17, "with, respective" should read -- with respective --.
Line 67, "cavity 77," should read -- cavity 77. --.

<u>Column 13,</u>
Line 15, "to)" should read -- top --.

<u>Column 18,</u>
Line 20, "aid forming" should read -- and forming --.

Signed and Sealed this

Tenth Day of June, 2003

JAMES E. ROGAN
*Director of the United States Patent and Trademark Office*